United States Patent [19]

Nolden

[11] 4,393,523
[45] Jul. 19, 1983

[54] TUB FILLING AND SHOWER VALVE

[75] Inventor: Werner Nolden, Wittlich, Fed. Rep. of Germany

[73] Assignee: American Standard Inc., New York, N.Y.

[21] Appl. No.: 363,695

[22] Filed: Mar. 30, 1982

[30] Foreign Application Priority Data

Mar. 30, 1981 [DE] Fed. Rep. of Germany ....... 3113615

[51] Int. Cl.³ .............................................. E03C 1/04
[52] U.S. Cl. ............................................ 4/192; 4/191
[58] Field of Search .......................... 4/191, 192, 661; 137/801, 616.5, 616.7, 625.46, 625.41; 251/119, 149.8, 352, 349

[56] References Cited

U.S. PATENT DOCUMENTS

| 1,676,035 | 7/1928 | Lehnert | 4/192 X |
| 2,627,872 | 2/1953 | Gruen | 4/191 X |
| 3,034,138 | 5/1962 | Filliung | 4/192 |
| 3,086,784 | 4/1963 | Reinemann | 4/191 X |
| 3,273,172 | 9/1966 | Wilks, Jr. | 4/192 |
| 3,322,152 | 5/1967 | Aechter | 251/352 |
| 3,374,957 | 3/1968 | Tyler | 4/192 X |
| 3,402,406 | 9/1968 | Kaiser | 4/192 |
| 3,593,961 | 7/1971 | Stewart | 251/349 |
| 3,834,665 | 9/1974 | Kurioka | 251/349 |
| 3,855,639 | 12/1974 | Billeter | 251/352 X |
| 4,019,536 | 4/1977 | Dong et al. | 251/352 X |
| 4,083,383 | 4/1978 | Antoniello | 251/352 X |

Primary Examiner—Henry K. Artis
Attorney, Agent, or Firm—James J. Salerno, Jr.; Robert G. Crooks; John P. Sinnott

[57] ABSTRACT

A tub filling and shower fitting having a change-over valve means is operatively coupled to tub spout inlet whereby the change-over valve means is shifted from a tub mode to a shower mode by swivelling of the tub inlet spout.

2 Claims, 2 Drawing Figures

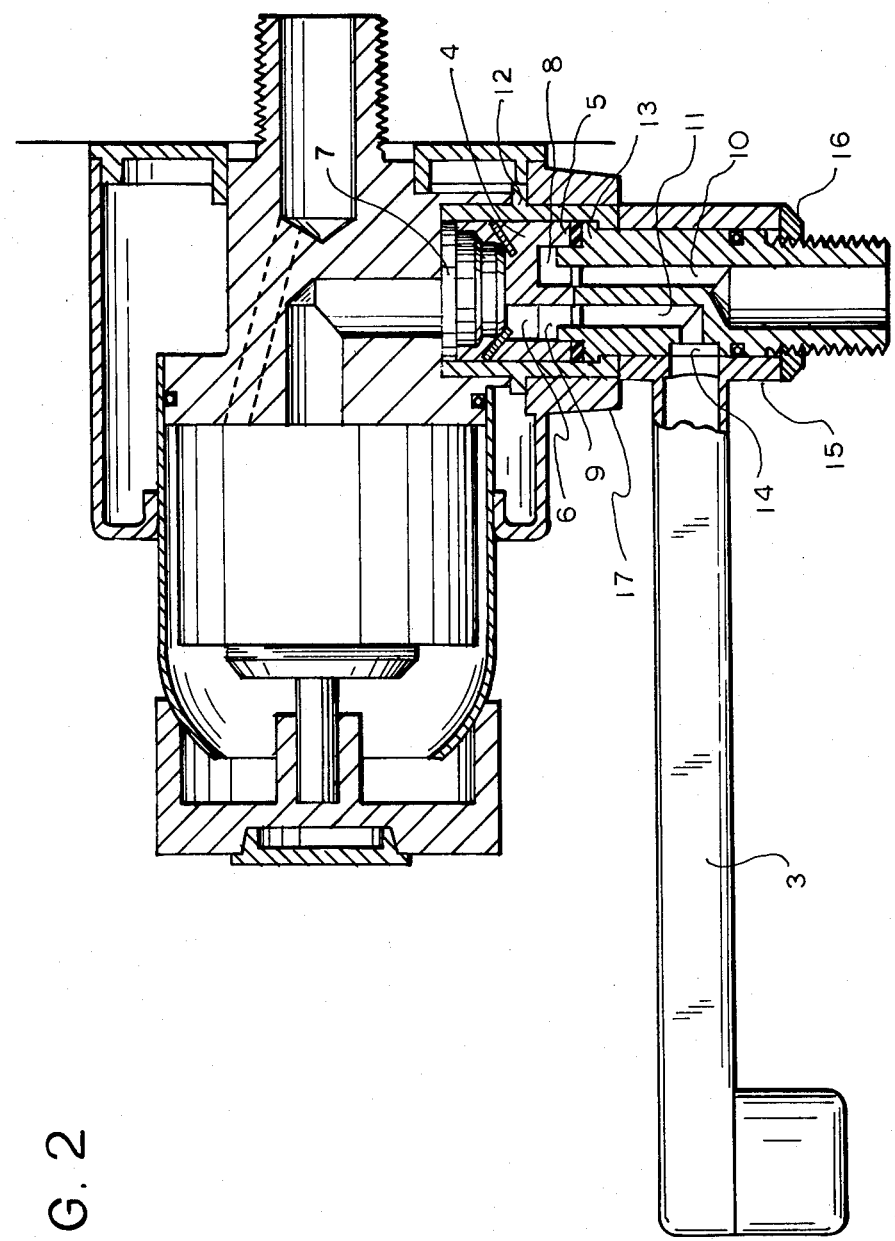

TUB FILLING AND SHOWER VALVE

BACKGROUND OF THE INVENTION

A mixing valve for tub filling and shower operation is provided with manually or automatically operated change-over devices. In the latter, the inlet is always open when the valve is closed, so that an undesirable operation of the shower is avoided when opening the valve. In the former devices, the change-over from the shower to the tub operation must be operated manually, that is, even when the valve is closed.

The operating elements as additional structural elements of the known change-over devices for operating mixing valves are usually of the button or toggle type or have a similar structure, and are so designed that they can be pulled, rotated or pivoted. The hitherto known change-over devices such as diverter valves frequently do not show the user whether the operating elements are in the tub mode or the shower mode position. Therefore, with the manually operated change-over devices, it frequently occurs that the mixing valve is in the shower mode position so that in operation the user will accidently get wet. Even with the so-called automatic change-over devices, an undesirable shower operation is possible when opening the valve since the automatic change-over device may not always function satisfactorily. This is primarily caused by the control elements that are more difficult to operate after a period of time.

SUMMARY OF THE INVENTION

It is therefore an object of the invention to eliminate these disadvantages and to provide a tub filling and shower valve with a change-over device such as a diverter valve, which assures a safe mode of operation, despite having a simple structure. This object of the invention is achieved in an advantageous manner in that the change-over device together with a pivotable tub inlet spout forms a functional unit in such a manner that the change-over occurs by pivoting or swivelling the tub inlet spout.

The position or mode of the valve is easily recognized before use due to the size of the tub inlet spout, so that the user immediately understands and recognizes in which operating mode the change-over device is positioned. Due to the relative long lever arm provided by the tub inlet spout for actuating the change-over device, the desired easy operation of the device is assured over a long period of time. In addition, due to the available tub inlet change-over device the mixing valve of the present invention is inexpensive to manufacture.

The ease of operation is additionally assured by using suitable control elements for the change-over device. For this purpose, the change-over device is provided in accordance with a specific feature of the invention in that the device is provided with two superimposed control discs, one of which is designed as a seating or stationary disc having a throughput opening for connecting the mixed water discharge of the valve, while the other control disc is designed to rotate on the other valve disc in face-to-face contact therewith and is provided with two throughput openings which individually can be brought into alignment with the throughput opening of the stationary disc of the valve, whereby a control bushing fixedly coupled to one end of the rotatable valve disc and at the opposite end is coupled to the shower by one of the conduits. The control bushing is also coupled to the pivotable tub inlet at its center area and to the other conduit by means of a lateral discharge opening in the control bushing.

A further advantageous design of the invention is provided whereby the tub filling and shower valve with a changeover device includes a tub inlet which is mounted to the control bushing. The tub inlet is formed having a bushing-like shape at its one end and is provided with an inner knurl that engages a corresponding outer knurl on the control bushing.

BRIEF DESCRIPTION OF THE DRAWINGS

In the drawing, an illustrative embodiment of the invention is shown in which:

FIG. 2 is an elevational view, partly in section, illustrating the elements of the change-over device.

DETAILED DESCRIPTION OF THE PREFERRED EMBODIMENT

Figure 1:
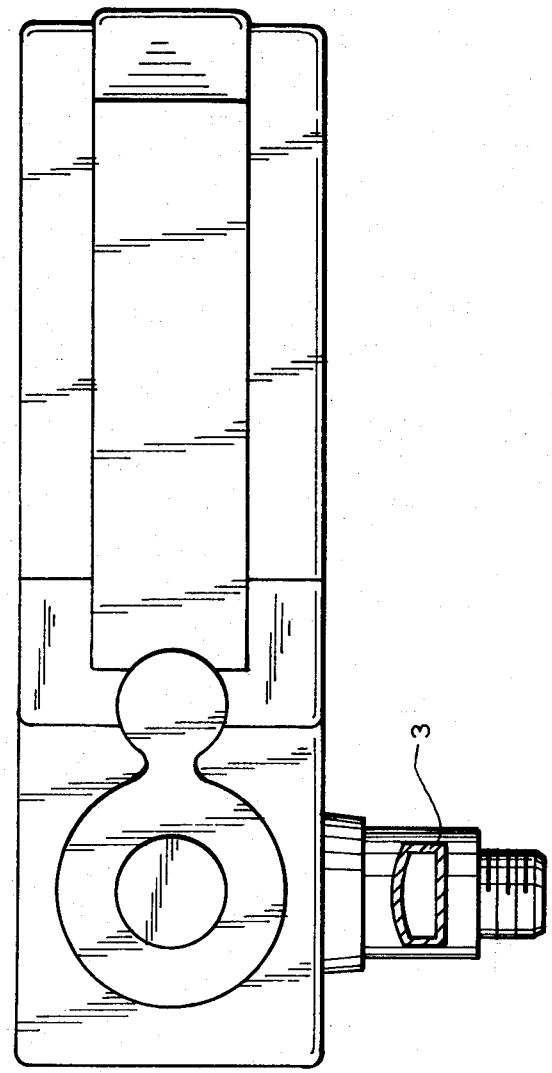
FIG. 1 is a front elevational view of the tub filling and shower valve of the present invention.

The drawing shows the tub filling and shower valve with a pivotable tub inlet spout 3 with which the change-over device is provided with two superimposed control discs 4 and 5. One of the control discs is designed as a stationary seating disc 4 and is provided with a throughput opening 6 which is connected to the water mixing discharge chamber 7 of the valve. The other control disc 5 is rotatably mounted on valve seating disc 4 and is provided with two throughput openings 8 and 9, which are individually brought into cooperation with the throughput opening 6 of seating disc 4. The discharge openings 8 and 9 are each coupled respectively to conduits 10 and 11 of a control bushing 13, which is rotatably mounted in a housing portion 12 of the valve. One end of control bushing 13 is fixedly connected to the valve disc 5 and the other end is connected by means of a conduit 10 to a shower outlet, not shown. The center area of the control bushing is coupled to pivotable tub inlet 3, which is connected to the other conduit 11 by means of the lateral discharge opening 14 of control bushing 13.

In the shown position, the tub inlet 3, the throughput opening 6 of seating disc 4 covers the throughput opening 9 of valve disc 5 which discharges water into conduit 11, so that the tub inlet 3 is released. When the tub inlet 3 is pivoted to the side, that is, in the direction toward the wall, the shower is released by turning the control bushing 13 so that the other throughput opening 8 of valve disc 5 is brought into alignment with the throughput opening 6 of the seating disc 4. The control bushing 13 is designed in such a manner that it can be mounted to the tub inlet spout 3. The corresponding end 15 of tub inlet spout 3 is designed having an inner knurl which engages the corresponding outer knurl of control bushing 13. The tub inlet spout 3 is secured in its position by means of a nut 16. An adjustment ring 16 is also provided.

As already mentioned, the shown and described embodiment is only one example for practicing the invention and is not limited thereto. Other means are available within the framework of the inventive principle, in particular with respect to the arrangement and design of the individual structural parts. It is to be understood that other control elements may be used for the change-over device and that the present valve design may be used with any given control element for volume and temperature control and the valve may be designed as a dual control valve.

I claim:

1. Tub filling and shower valve comprising a pivotable tub inlet assembly including a change-over valve means for directing the flow of water from a tub mode to a shower mode, said change-over valve means having a pair of superimposed control discs, one of which is a seating disc having a throughput opening coupled to a water discharge mixing chamber and the other control disc being rotatably mounted on said seating disc and having two throughput openings which are adapted to be aligned with said throughput opening of said seating disc, a control bushing rotatably mounted in a housing of said valve and having a pair of conduits, one end of which is coupled to said throughput openings of said rotatable disc with the opposite end being coupled to a shower outlet by one of said conduits of said control bushing and said other conduit being coupled to said pivotable tub inlet means of a lateral discharge opening in said control bushing.

2. The tub filling and shower valve of claim 1 wherein said control bushing includes an outer knurl on one end which engages a corresponding inner knurl of said control bushing.

* * * * *